G. M. READING.
PORTABLE APPARATUS FOR SUPPORTING, CUTTING OFF, AND RETHREADING OIL CASINGS.
APPLICATION FILED MAR. 17, 1921.

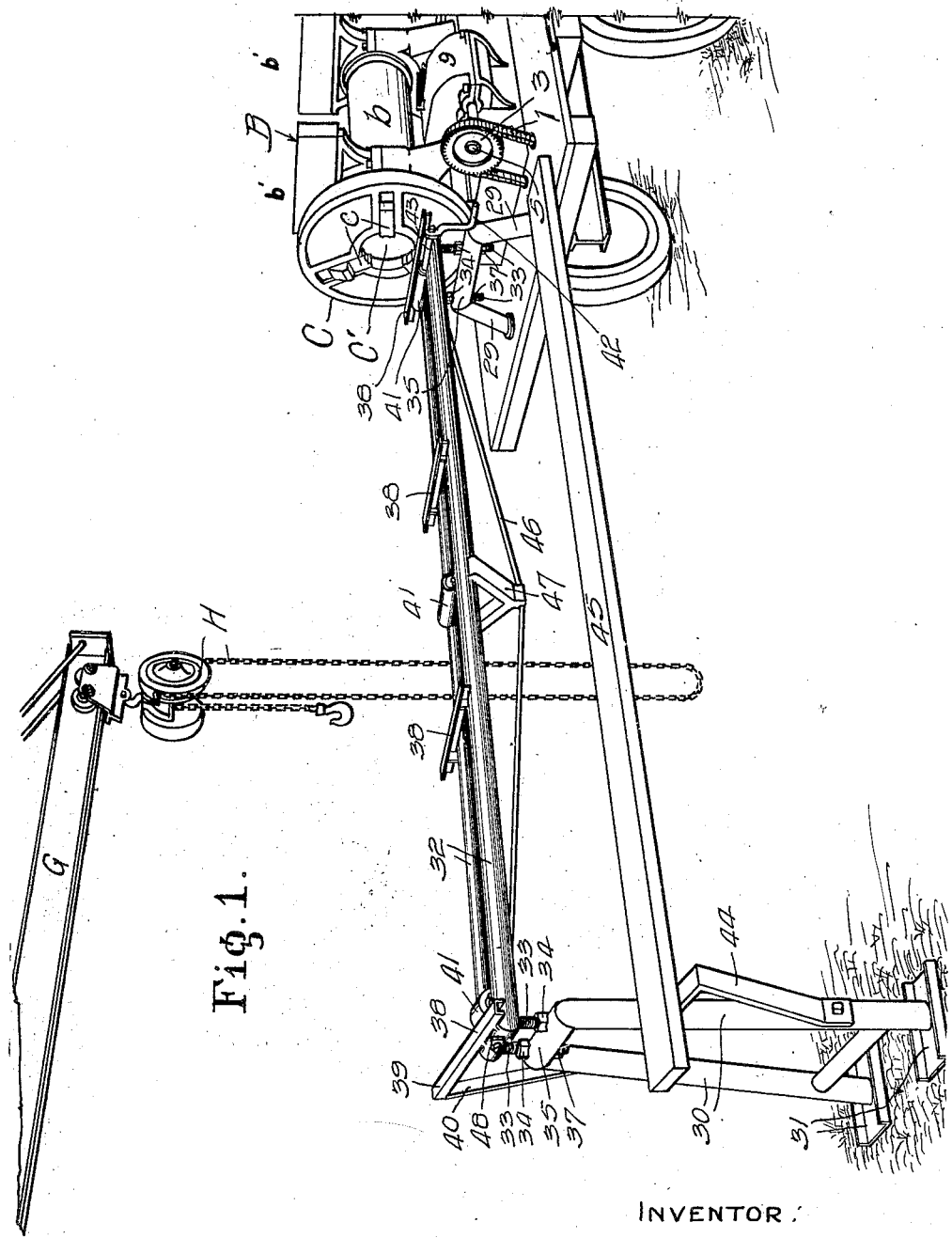

1,437,552.

Patented Dec. 5, 1922.

INVENTOR:
George M. Reading.
BY Harold C. Thorne
ATTORNEY.

G. M. READING.
PORTABLE APPARATUS FOR SUPPORTING, CUTTING OFF, AND RETHREADING OIL CASINGS.
APPLICATION FILED MAR. 17, 1921.

1,437,552.

Patented Dec. 5, 1922.

INVENTOR:
George M. Reading.
BY Harold C. Thorne
ATTORNEY

G. M. READING.
PORTABLE APPARATUS FOR SUPPORTING, CUTTING OFF, AND RETHREADING OIL CASINGS.
APPLICATION FILED MAR. 17, 1921.
1,437,552.
Patented Dec. 5, 1922
4 SHEETS—SHEET 4.
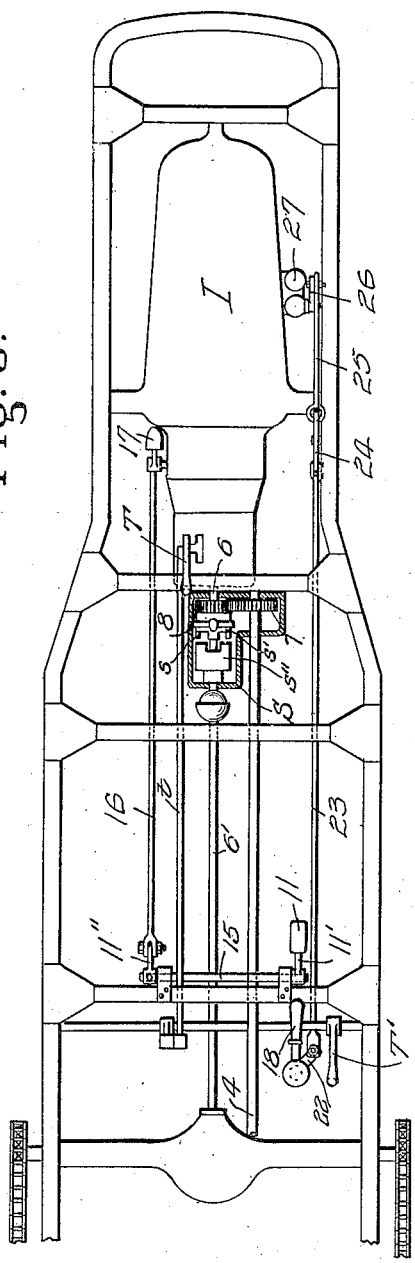
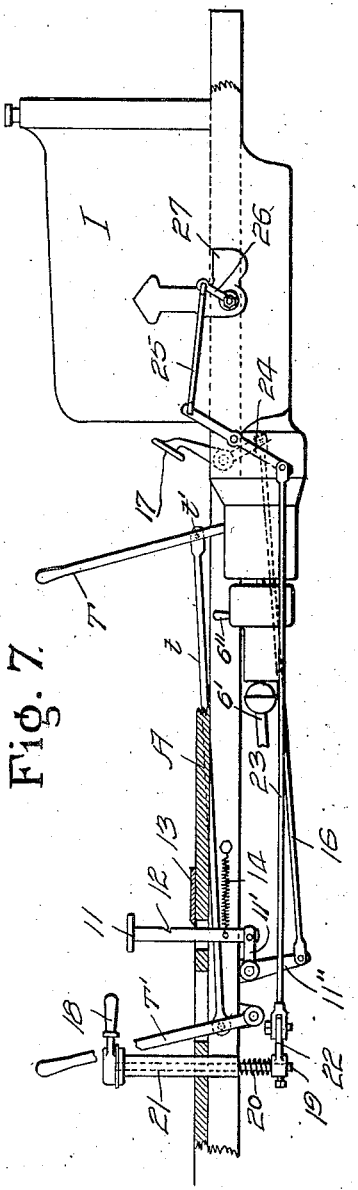
INVENTOR:
George M. Reading.
BY Harold C. Thorne
ATTORNEY Patented Dec. 5, 1922.

1,437,552

UNITED STATES PATENT OFFICE.

GEORGE M. READING, OF BRECKENRIDGE, TEXAS.

PORTABLE APPARATUS FOR SUPPORTING, CUTTING OFF, AND RETHREADING OIL CASINGS.

Application filed March 17, 1921. Serial No. 453,188.

*To all whom it may concern:*

Be it known that I, GEORGE M. READING, a citizen of the United States, residing at Breckenridge, in the county of Stephens and State of Texas, have invented certain new and useful Improvements in Portable Apparatus for Supporting, Cutting Off, and Rethreading Oil Casings, of which the following is a specification.

My invention relates to a portable apparatus for supporting, cutting-off and threading oil casings, or pipes, of all sizes which have been used and require cutting-off and rethreading prior to being used again in the process of drilling wells in the oil fields.

Heretofore, it has been customary to transport all of the used pipes, or oil casings from the field of operation to some remote machine shop having the required facilities for handling pipe cutting and rethreading work. This means that the pipes have to be transported by vehicle or train to some town remote from the field of operation, and, it is an object with my invention to obviate the necessity of transporting the pipes from the area of operation to a machine shop to be cut-off and rethreaded and then reshipped to the field of operation by providing a pipe supporting carriage in association with a motor truck, pipe cutter and threader and a derrick to enable the pipes or casings to be cut-off and rethreaded wherever the pipe or casings are found.

An object of the invention is the mounting of a pipe cutting and threading machine upon a motor truck and providing connection between the machine and the usual transmission of the motor truck for operating the pipe cutting and threading machine.

A further object of the invention is the provision of means for supporting a pipe in alignment with the bore of the spindle of the pipe cutting and threading machine.

A still further object of the invention is to provide the pipe supporting table with a plurality of rollers upon which the pipe is layed, and, by the manual movement of one of said rollers, the pipe is fed into the bore of the spindle of the pipe cutting and threading machine and supported by the roller table at its free end while being cut off and rethreaded.

A further object of the invention is the provision of a walking platform supported by both the truck and the pipe supporting table.

A still further object of the invention is the provision of means fixed to the pipe supporting table to accommodate a pipe on either side of the pipe being cut-off or rethreaded.

A still further object of the invention is the provision of means for hoisting pipes upon the supporting table and lowering them therefrom.

With the above and other objects in view, the invention consists in the new features of construction, arrangement, combination and association of parts hereinafter described and finally pointed out in the claims hereto appended.

Referring to the accompanying drawings forming a part of this specification wherein like characters of reference denote similar parts throughout the several views:

Fig. 1, is a view, in perspective, of an apparatus constructed in accordance with my invention.

Fig. 6, is a plan view showing the connection between the pipe machine and the transmission drive shaft.

Fig. 7, is a side elevation showing the clutch control mechanism, and the throttle control mechanism.

Figure 3:
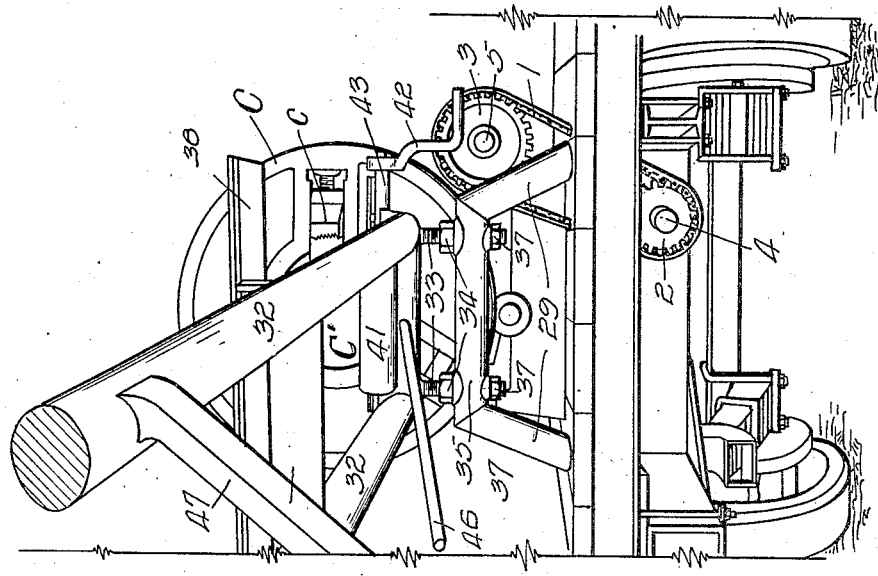
Fig. 3, is a detail, in perspective, showing the end of the pipe supporting table which is supported at one end by the motor truck.

Referring to the drawings, the reference character A indicates the floor of a motor truck and B a suitable pipe machine having a spindle $b$ mounted on the floor A of the motor truck. The pipe machine B is provided with a suitable chuck C having the jaws $c$ for holding an oil pipe or casing D, a suitable die holder E provided with the removable dies $e$, and the suitable cutting-off tool F carried by the movable-head f of the carriage f'.

G indicates a suitable derrick hoisting arm provided with a suitable block and tackle mechanism H for handling the pipes or casings D.

The pipe machine B is driven through the medium of a chain 1 riding over the sprockets 2 and 3, fixed to the shafts 4 and 5, respectively. Shaft 4 is suitably connected with the transmission drive shaft 6 through the medium of the gears 7 and 8, as shown in Fig. 6. The shaft 5, through a train of suitable gears within the gear case 9 of the pipe machine, drives the gear 10 fixed to the spindle of the pipe machine for revolving the chuck C, as is manifest.

The gears 7 and 8 as best represented in Figure 6, may be enclosed in a casing S, comprising a suitable housing for them, and a jaw clutch s. In order to interchangeably drive the vehicle wheels and shaft 4, gear 8 may be splined to shaft 6 and carry a member s' of the clutch s. The other member s" of the clutch is mounted on the section 6' of the transmission drive shaft. A handle 6" connected with the members s' of the clutch extends from the casing S and may be operated to throw the members of the clutch into engagement, or gear 8 into engagement with gear 7, as desired.

The transmission gear shift lever T, as shown in Figures 6 and 7, is connected with an auxiliary gear shift lever T' by means of lever mechanism including an extension rod t which is adapted to be fastened to the lever T by means of a pin t'. Thus the operator of the pipe machine B can control the transmission gears and throw them into direct, neutral or reverse for driving the machine or backing it off the pipe, as required. When the engine is to be used for driving the truck the pin t' should be removed to disconnect rod t so as not to interfere with operating lever T for shifting the gears.

The clutch may also be operated for controlling the revolving movement of the pipe chuck C by means of a foot pedal 11 having a notch 12 for contact with a plate 13. A spring 14 is fixed at one end to the chassis frame of the motor vehicle and at its opposite end to the foot pedal for holding the notched edge of the foot pedal 11 in contact with the plate 13, as is manifest. A rocker shaft 15 is pivotally supported adjacent the lower end of the foot pedal 11 and one arm 11' of the rocker shaft is pivotally connected to the lower end of the foot pedal, while arm 11" of rocker shaft 15 is pivotally connected to the rear end of a connecting rod 16. The forward end of connecting rod 16 has pivotal connection with the lower end of the usual clutch pedal 17 of the motor vehicle, so that the motor clutch may be controlled through the auxiliary foot pedal 11 by the operator while working near the rear end of the apparatus.

18 indicates a throttle control lever fixed to the upper end of a vertically disposed shaft 19 positioned adjacent the auxiliary motor clutch control pedal 11. The lower end of the shaft 19 is provided with a coiled spring 20 so as to cause frictional contact between the head of the lever 18 and the casing 21 to prevent casual displacement of the throttle control lever 18. The extreme lower end of the throttle control lever 18 is provided with a horizontally disposed arm 22 to which is connected the rear end of a connecting rod 23. The forward end of the rod 23 is pivotally connected to the lower end of a pivotally supported lever 24 positioned adjacent the motor I of the motor truck. A suitable connecting rod 25 is pivotally connected at its rear end to the upper end of the lever 24 and its forward end is adapted to be connected to an arm 26 of the carburetor 27 for controlling the fuel from the carburetor to the engine cylinders to regulate the speed of the motor, as is manifest, from the rear end of the apparatus. When the engine is to be used for propelling the vehicle, rod 25 may be disconnected from the carburetor so as not to interfere with the usual throttle operating mechanism (not shown).

The means for supporting a pipe D while the old screw threaded end 28 thereof is being cut-off and the pipe rethreaded, consists of the suitably inverted U-shaped supporting legs 29 and 30. The rear supporting legs 30 are longest and are mounted upon suitable shoes 31 which rest upon the ground a suitable distance to the rear of the motor truck to prevent the legs 30 from sinking into the soil. The forward supporting legs 29 are relatively short and suitably fixed to and supported by the floor A of the motor truck, as clearly shown in Figs. 1 and 3 of the drawings. 32 indicates a suitable table frame supported by the legs 29 and 30. The frame 32 is provided at each corner with a suitable depending screw-threaded member 33 having a suitable upper adjusting nut 34. Each screw threaded member 33 passes through an opening in the upper cross member 35 of the supporting legs 29 and 30 and the table frame 32 is supported by the adjusting nuts 34 so as to regulate the elevation of the pipe supporting table frame 32. A lock nut 37 is also carried by each screw member 33 at its lower end to prevent upward displacement of the table frame 32, as clearly shown in Figs. 1 and 3 of the drawings. The table frame 32 is provided with a plurality of suitably spaced pipe supporting cross pieces 38 which extend beyond the side edges of the table frame 32 a suitable distance upon either side, as shown in Fig. 1. The rear cross-piece 38 is preferably provided with an extension 39 which is supported by means of a suitable brace member 40. This extension provides an extended pipe rest at the rear end of the pipe supporting device.

The pipe supporting table frame 32 is further provided with a plurality of suitably supported roller members 41 so arranged between the frame members, that the upper surface of each roller will lie slightly above the upper faces of the pipe supporting cross-pieces 38. The forward roller 41 is provided with a suitable handle, or crank 42 which is suitably fixed to the axle 43 of the forward roller 41, as clearly shown in Figs. 1 and 3.

One of the rear supporting legs 30 is provided with a suitable bracket 44 for supporting one end of a runway plank 45. The opposite end of the runway plank 45 is supported by the floor A of the motor truck, as clearly shown in Fig. 1. This permits the operator to walk from the truck to the rear end of the pipe supporting frame, when desired, to assist in directing the pipe into the spindle of the pipe machine or extracting it therefrom.

The pipe supporting table frame 32 is braced from below by means of a suitable truss-rod 46 riding over a central depending brace arm 47. Each end of the rod is screw threaded to pass through the end members of the frame 32 and provided with an adjusting nut 48.

Figure 2:
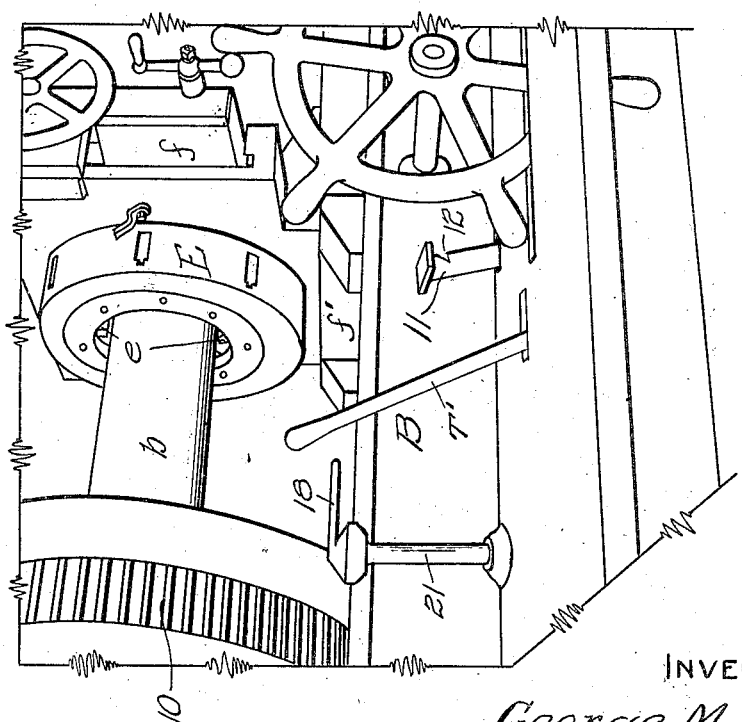
Fig. 2, is a view, in perspective showing the end of a pipe being threaded.
Figure 4:
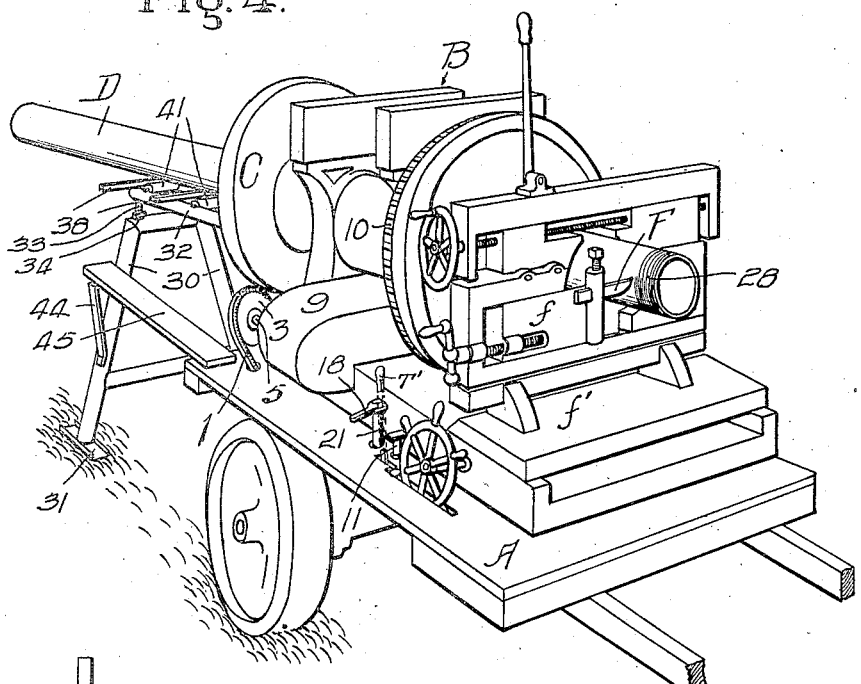
Fig. 4, is a detail, in perspective, showing the old threaded end of a pipe supported in position to be cut-off prior to being rethreaded.
Figure 5:
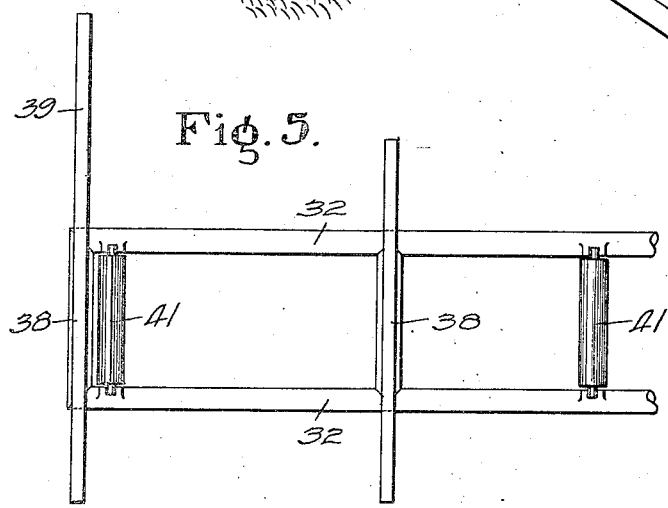
Fig. 5, is a detail, in plan view, of the rear end of the pipe supporting table.

The operation of hoisting, cutting-off, rethreading and lowering pipes at the oil fields wherever found, is as follows:

The old pipes D which are usually piled up to one side of the pipe supporting table, are elevated to and laid upon the ends of the cross-pieces 38 of the table frame 32 by means of the derrick hoisting arm G and block and tackle mechanism H. The pipe D then is rolled into place upon the rollers 41 of the table frame 32 so as to lie in alignment with the opening C' of the chuck C and spindle $b$ of the pipe machine B. The operator next turns the crank-handle 42 of the forward roller 41, thus moving the forward end of the pipe D into and through the spindle $b$ of the pipe machine B until the forward old screw threaded end 28 of the pipe D lies adjacent the cutting-off tool F of the pipe machine B. The jaws $c$ of the chuck C are then brought into contact with the pipe for holding the pipe firmly between the jaws of the chuck C. The chuck C is then revolved through its actuating mechanism and the old forward threaded end 28 of the pipe D is cut-off with the cutting-off tool F. After the old screw threaded end 28 of the pipe D has been cut off, the chuck jaws $c$ are loosened and the pipe D is moved rearwardly by turning crank 42 and the cut-off end of the pipe D is then positioned between the dies $e$, as shown in Fig. 2. The chuck jaws $c$ are again tightened and the pipe D revolved for cutting new threads upon the end of the pipe D, as is manifest. After the new threads have been cut, the chuck jaws $c$ are again loosened and by means of the handle 42, the pipe D is carried rearwardly upon the rollers 41 discharging it from the spindle $b$ of the pipe machine B. After this operation, the pipe D is rolled off of the rollers 41 onto the sides of the pipe supporting cross-pieces 38 opposite to where it was first deposited, and, then the pipe is finally lowered from the table frame 32 by means of the derrick arm G, and block and tackle mechanism H, as is manifest, and placed in a pile alongside the apparatus.

The operation is continuous and the job can be handled by two men right at the oil fields, thus obviating the necessity of shipping the pipe to machine shops remote from the area of oil operations.

It is evident from the foregoing description, that the apparatus is portable and capable of being moved from place to place in the field of oil operations, thus saving both time and expense in being able to rethread the used oil pipes right in the field instead of in remote machine shops, as has been the custom heretofore.

When it is desired to move the equipment, the table frame 32 may be unfastened from the supporting legs 29 and 30 and placed in an inverted position on the blocks $b'$, $b'$. of the pipe machine B, and securely bolted thereto. The supporting legs 30 and runway plank 45 can be carried on the truck, also the derrick G, which may conveniently be permanenty mounted on the truck to one side of the pipe machine B. There is a very large saving in the use of an apparatus of this character, even though there is a machine shop right in the field, as it will be observed that with the use of an apparatus of this character, it may be moved opposite the pipes, thus obviating the necessity of transporting the pipe, as heretofore.

The many advantages of the hereindescribed invention will readily suggest themselves to those skilled in the art to which it appertains.

I do not wish to be understood as having limited myself to the exact details of construction shown and described, but desire to have it understood that the invention I have shown in the drawings, is merely illustrative, as it is manifest that various minor changes may be made in the exact construction and particular arrangement of parts without departing from the spirit of my invention, hence I reserve the right to make any such changes, or modifications, as may fairly fall within the scope of the appended claims when fairly construed.

What I claim is:

1. In an apparatus of the class described, in combination, a portable motor apparatus, a pipe machine mounted upon said apparatus, a derrick provided with a block and tackle mechanism positioned to the rear of the apparatus, a pipe supporting table supported at its forward end upon the floor of the portable motor apparatus and at its opposite end upon the ground, pipe supporting cross-pieces carried by the table and means carried by the table for moving a pipe into and out of the pipe machine.

2. In combination, a motor truck, a pipe cutting and threading machine mounted upon the floor of the motor truck, means for actuating said pipe cutting and threading machine, means positioned to the rear of the motor truck and connected thereto for supporting pipes to be cut-off and re-threaded and means for moving the pipes into and away from the pipe cutting and threading machine.

3. In combination, a motor truck, a pipe machine mounted upon the floor of the motor truck, means for actuating said pipe machine, means positioned to the rear of the truck and connected therewith for supporting pipes, means for raising the pipes from the ground to the pipe supporting means and means for moving a pipe into and away from the pipe machine.

4. In combination, a motor truck, a pipe machine mounted upon the floor of the truck, means for actuating said pipe machine, a pipe supporting table extending rearwardly from the floor of the motor truck, means for raising and lowering the elevation of said pipe supporting table, cross-pieces carried by said table, rollers mounted upon said table for supporting a pipe and means for revolving one of said rollers for moving the pipe into and away from the pipe machine.

5. In combination, a motor truck, a pipe machine mounted upon the floor of the truck, means for actuating said machine, pipe supporting means comprising a plurality of supporting legs, one pair of which is connected to the floor of the motor truck, a pipe supporting table frame adjustably supported upon said supporting legs, cross-pieces connected to the upper side of said table frame, a plurality of rollers supported by said table frame and means for manually revolving one of said rollers for moving a pipe into the pipe machine and for removing it therefrom.

6. In combination, a motor truck, a pipe machine mounted upon the floor of the truck, means for connecting the pipe machine with the motor of the motor truck for actuating said machine, a pipe supporting apparatus comprising a plurality of supporting legs, one pair of which is connected to the motor truck, a pipe supporting table frame adjustably supported upon said supporting legs, cross-pieces connected to the upper side of said table frame, a plurality of rollers supported by said table frame, means for manually revolving one of said rollers for moving a pipe into the pipe machine and removing it therefrom and a pipe hoisting derrick positioned adjacent the motor truck for raising and lowering the pipe to and from said pipe supporting table frame.

7. In an apparatus of the class described, in combination, a motor truck, a pipe machine mounted upon said motor truck, means for actuating said pipe machine, pipe supporting means positioned to the rear of said truck and extending rearwardly therefrom, means for raising and lowering the elevation of said pipe supporting means, means for raising and lowering pipes to and from said pipe supporting means and means for moving a pipe mounted upon said pipe supporting means into and away from the pipe machine.

8. In a device of the class described, the combination with a motor truck provided with a pipe machine, means positioned to the rear of said truck and pipe machine for supporting pipes to be cut-off and re-threaded and means for feeding one pipe at a time into the pipe machine and removing it therefrom after it has been cut-off at one end and rethreaded.

9. In an apparatus of the class described, in combination, a motor truck having a motor, transmission drive shaft and a clutch, a pipe machine mounted upon said motor truck, means connecting the pipe machine with the transmission drive shaft for revolving a pipe in the machine, a clutch connecting mechanism for controlling the action of said machine, means for supporting pipes prior to being moved into the pipe machine.

10. In combination with a motor vehicle, a machine tool mounted thereon, a drive shaft for said machine tool, and a connecting member between the vehicle motor and said drive shaft for driving said machine tool.

11. In combination with a motor vehicle including a motor, a machine tool mounted thereon, and means for disconnecting the vehicle motor from the driving wheels of the vehicle and connecting it with said machine tool for driving the same.

12. In combination with a motor vehicle including a motor, a machine tool mounted thereon, a drive shaft for said machine tool, clutch mechanism on the power transmission shaft from the vehicle motor for disconnecting the same from the driving wheels of the vehicle, and connecting it with said drive shaft.

13. In combination with a motor vehicle including a motor and having a transmission gear shift, clutch and throttle, a machine tool mounted thereon, means for connecting the vehicle motor with said machine tool for driving the same, means extending to a position adjacent the said machine for operating the transmission gear shift, clutch and throttle for the purpose specified.

14. In combination with a motor vehicle, a machine tool mounted thereon, a longitudinal work rest supported at one end by the vehicle and extending from said machine, and means for supporting the other end of said work rest.

15. In combination with a motor vehicle, a machine tool mounted thereon, a support mounted on the vehicle adjacent said machine, a support adapted to be positioned beyond said vehicle, and a longitudinal work rest extending from said machine and mounted on said supports.

16. A pipe rest comprising a longitudinal frame member having laterally extending pipe supporting bars upon which the pipes can roll, a plurality of rollers carried by the frame, having their axes extending laterally thereof and their upper surfaces extending above the plane of said pipe supporting bars whereby when the pipes have rolled onto said rollers they may be given a longitudinal movement, and means for supporting said frame member.

17. A pipe rest comprising a longitudinal frame member having laterally extending pipe supporting bars upon which the pipes can roll, a plurality of rollers carried by the frame having their axes extending laterally thereof and their upper surfaces extending above the plane of said pipe supporting bars, means for rotating one of said rollers for moving a pipe on the rollers longitudinally, and means for supporting the frame member.

18. A pipe rest comprising a longitudinal frame member adapted to be supported in a substantially horizontal position for receiving one or more lengths of the pipe, a motor vehicle having a rearwardly extending platform a supporting member for supporting one end of said frame from said platform on the rear end of said motor vehicle, a second supporting member for supporting the other end of said frame and adapted to be mounted to the rear of the motor vehicle, and means for raising and lowering said frame with respect to said supporting members for the purpose specified.

19. A pipe rest comprising a longitudinal frame member adapted to be supported in a substantially horizontal position for receiving one or more lengths of pipe, a pair of inverted U-shaped supporting members adapted to be positioned cross-wise under the ends of said frame, a screw-threaded member depending from the corners of the frame and each adapted to pass through an aperture in the upper part of the U-shaped members, and nuts on each of the screw-threaded members for adjustably holding the longitudinal frame on the U-shaped supporting members.

20. In combination with a motor vehicle having a throttle clutch and transmission shift levers and a motor, a machine tool having a driving connection with the said motor, an additional set of throttle, clutch and transmission shift levers positioned toward the rear of the vehicle comprising a clutch operating pedal having connections with the vehicle clutch, said clutch operating pedal having means associated with it for maintaining the clutch members out of engagement, a transmission shift lever having a connection with the forward transmission shift lever for actuating it into direct and reverse driving positions and neutral, and a throttle operating lever having connections extending to the motor throttle.

21. In combination with a motor vehicle having a throttle and a motor, a machine tool having a driving connection with the said motor, a throttle operating lever including a vertical rod from which the lever extends, a casing for supporting said rod and lever, a lever arm on the lower end of said rod having connections extending to the motor throttle, and a spring positioned between said casing and the last said lever for the purpose specified.

22. In combination with a motor vehicle having a clutch and a motor, a machine tool having a driving connection with the said motor, a clutch operating pedal having connections with the vehicle clutch such as to disengage the members thereof when the pedal is depressed, and means associated with the pedal for maintaining the clutch members out of engagement when it has been depressed.

23. In combination with a motor vehicle having a transmission gear shift lever and a motor, a machine tool having a driving connection with the said motor, a transmission shift lever having connections with the vehicle transmission gear shift lever by means of a rod adapted to actuate said gear shift lever into direct and reverse driving positions and neutral.

In testimony whereof I affix my signature.

GEORGE M. READING.